H. F. OLMSTED.
PERISCOPE CASING.
APPLICATION FILED AUG. 9, 1918.

1,311,087.

Patented July 22, 1919.
2 SHEETS—SHEET 1.

Witnesses
R. A. Thomas

Inventor
Harold Floyd Olmsted
By Victor J. Evans
Attorney

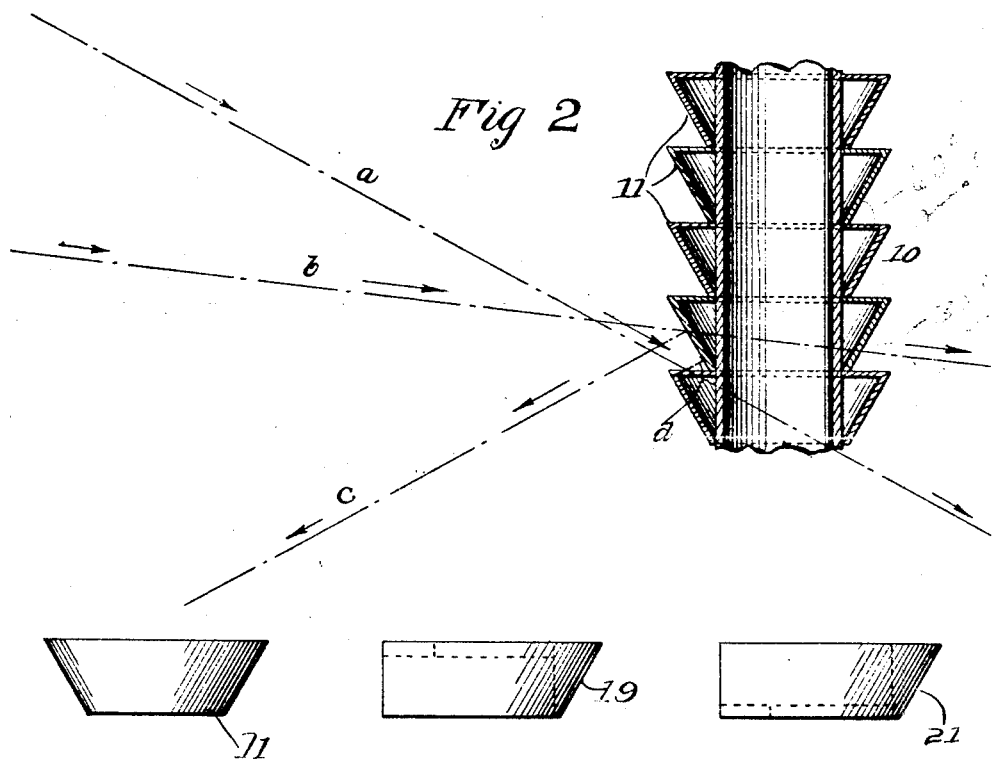
Fig 2
Fig. 3. 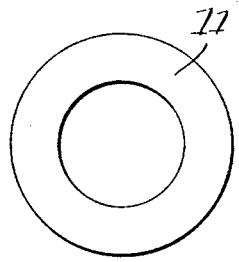 Fig. 6. 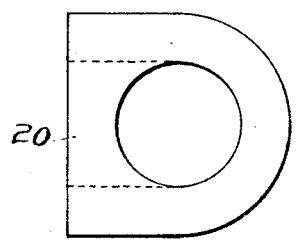 Fig. 8. 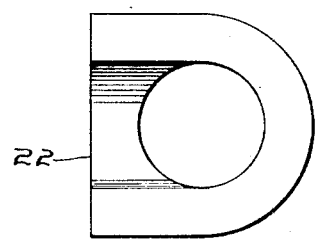
Fig. 4. Fig. 7. Fig. 9.
Witnesses
R. A. Thomas
Inventor
Harold Floyd Olmsted
By Victor J. Evans
Attorney

UNITED STATES PATENT OFFICE.

HAROLD FLOYD OLMSTED, OF GRAND RAPIDS, MICHIGAN.

PERISCOPE-CASING.

1,311,087.   Specification of Letters Patent.   Patented July 22, 1919.

Application filed August 9, 1918. Serial No. 249,143.

*To all whom it may concern:*

Be it known that I, HAROLD FLOYD OLMSTED, a citizen of the United States, residing at Grand Rapids, in the county of Kent and State of Michigan, have invented new and useful Improvements in Periscope-Casings, of which the following is a specification.

The object of the invention is to provide means in connection with a periscope by which its detection even at a comparatively short distance will be rendered difficult if not impossible, or in other words to provide a camouflaging means which may be applied to the regulation periscope at comparatively small cost, and without necessitating any change in the construction or arrangement of the operative parts of a periscope of the standard type.

Further objects and advantages will appear hereinafter it being understood that changes in form and proportion and in details of dimensions may be resorted to within the scope of the appended claims without departing from the spirit of the invention.

In the drawing:—

Fig. 2 is an enlarged detail view of a portion of the periscope showing in detail the lines of reflection, assuming arbitrarily certain lines of sight from a more or less remote ship or point of observation.

Figs. 3 and 4 are respectively side and plan views of a unit of the casing.

Figs. 6 and 7 are respectively side and plan views of the upper unit of the lens element.

Figs. 8 and 9 are side and plan views respectively of the lower unit of the lens element.

Figures 1, 5:
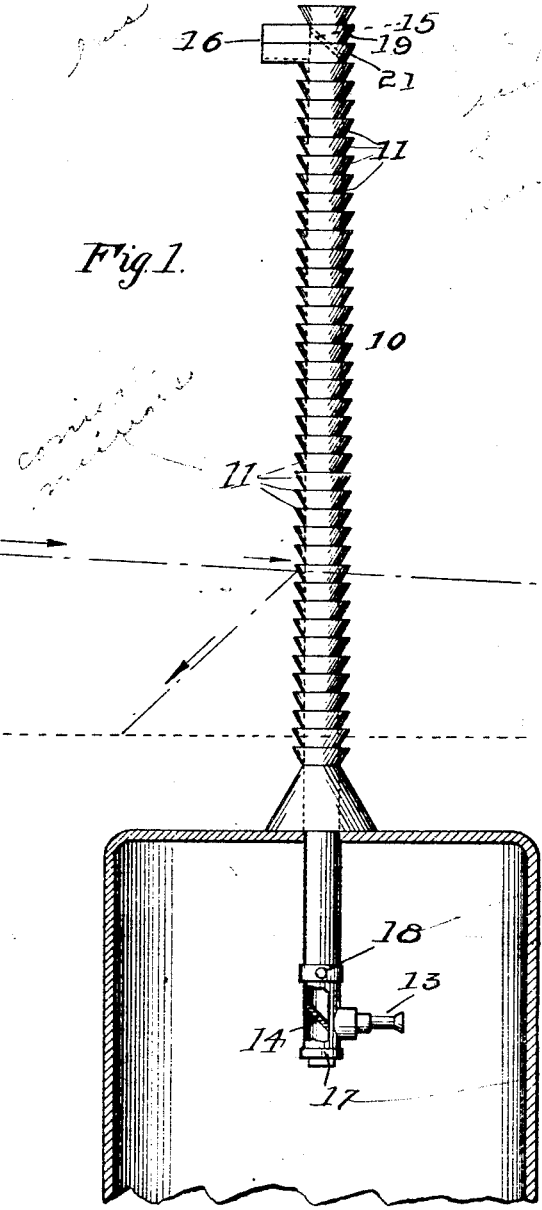
Figure 1 is a view of a periscope and related parts including the top of the conning tower and the station from which the lookout takes observation, direction lines being used in connection therewith to indicate planes of reflection.
Fig. 5 is a front view of the upper portion of the periscope facing the lens.

Essentially the camouflaging casing or cover for the periscope which is indicated at 10, consists of a series of units 11 constituting inverted conical mirrors, disposed in close relation with their conical surfaces inclined to reflect the water so that an observer at a distance sees the reflection of the water and the movement incident thereto and is prevented from discerning the outline of the periscope.

The bases of the cones constituting the units are also of reflecting material so that, as shown in Fig. 2, should the line of sight or vision impinge upon the flat upper surface, the reflection will show the same effect by reason of receiving the reflection from the next upper conical surface as shown by reference to Fig. 2, sight and reflection lines $a$, $b$ and $c$, lines $a$ and $b$ representing imaginary lines of vision and line $c$ the line of reflection from the water, while line $d$ shows the reflective relation between the base of one cone and the conical surface of the next.

As illustrated the conical surfaces of the units are arranged at an angle of sixty degrees from the plane of the bases of the next unit, each cone being of a thirty degree angle from its axis, but obviously this angle is susceptible of change without detracting materially from the efficiency of the device as the angle should be selected as experience may dictate. The unit may be made of highly polished metal and obviously should be non-rustable or non-corrodible.

At 13 there is illustrated the usual marine glass for the observer, while 14 and 15 represent the usual periscope mirrors for reflectively transmitting the object used through the lens 16 to the eye of the observer, '17 representing a removable cap on the lower end of the periscope and 18 the handles by which the periscope may be turned to give the observer a wide range of vision.

The lens element of the casing is represented by two units in the construction illustrated, said units differing in construction in some respects from the units 11 employed on the body portion of the periscope as shown in detail in Figs. 6 to 9 inclusive. The upper unit of the lens element, shown in detail in Figs. 6 and 7 is provided throughout the major portion of its periphery with the conical reflecting surface 19 corresponding with the units 11, but at 20 there is provided an observation space, while as to the unit shown in Figs. 8 and 9, and which is designed to be disposed below the unit shown in Figs. 6 and 7 there is also provided the conical under reflecting surface 21 with a horizontal lens area 22. This construction of the lens element preserves the general appearance of the casing while offering no substantial obstacle to the observation through the periscope.

Having described the invention I claim:—

1. A camouflaging casing for periscopes consisting of a plurality of inverted conical reflecting units.

2. A camouflaging casing for periscopes consisting of a plurality of inverted conical units having reflecting conical and base surfaces.

3. A camouflaging casing for periscopes consisting of inverted conical reflecting units and having a lens element consisting of upper and lower units having body portions of inverted conical form and observation sides which are respectively cut away and disposed parallel with the axis of the periscope.

In testimony whereof I affix my signature.

HAROLD FLOYD OLMSTED.

Copies of this patent may be obtained for five cents each, by addressing the "Commissioner of Patents, Washington, D. C."